(12) United States Patent
Lindner et al.

(10) Patent No.: US 8,839,686 B1
(45) Date of Patent: Sep. 23, 2014

(54) WIND TUNNEL TEST APPARATUS

(76) Inventors: Jeffrey L. Lindner, Madison, AL (US); Greg Laue, Huntsville, AL (US); John Cranston, Huntsville, AL (US)

( * ) Notice: Subject to any disclaimer, the term of this patent is extended or adjusted under 35 U.S.C. 154(b) by 333 days.

(21) Appl. No.: 13/453,697

(22) Filed: Apr. 23, 2012

Related U.S. Application Data

(63) Continuation of application No. 12/561,865, filed on Sep. 17, 2009, now abandoned.

(60) Provisional application No. 61/097,809, filed on Sep. 17, 2008.

(51) Int. Cl.
*G01N 19/00* (2006.01)
*G01M 9/00* (2006.01)

(52) U.S. Cl.
USPC .......................................... 73/865.9; 73/147

(58) Field of Classification Search
None
See application file for complete search history.

(56) References Cited

U.S. PATENT DOCUMENTS

| | | | |
|---|---|---|---|
| 1,604,828 A | 10/1926 | Howard | |
| 2,711,648 A | 6/1955 | Carlstrand | |
| 2,910,866 A | 11/1959 | Czerwinski | |
| 3,020,754 A | 2/1962 | Swanson | |
| 3,273,388 A | 9/1966 | Webb | |
| 3,338,093 A | 8/1967 | Usry | |
| 3,903,740 A * | 9/1975 | Baldwin | ......................... 73/147 |
| 5,076,108 A | 12/1991 | Trimarchi | |
| 5,190,289 A | 3/1993 | Nagai | |
| 5,501,101 A | 3/1996 | Purcell | |
| 6,609,981 B2 | 8/2003 | Hirata | |
| 7,302,840 B2 | 12/2007 | Hanff | |
| 2001/0041629 A1 | 11/2001 | Hirata | |
| 2005/0050952 A1 | 3/2005 | Hanff | |

FOREIGN PATENT DOCUMENTS

| | | |
|---|---|---|
| JP | 01267432 | 10/1989 |
| JP | 04102040 | 4/1992 |
| JP | 06148024 | 5/1994 |
| JP | 06307978 | 11/1994 |
| JP | 2002323403 | 8/2002 |

* cited by examiner

*Primary Examiner* — Andre Allen
*Assistant Examiner* — Jermaine Jenkins
(74) *Attorney, Agent, or Firm* — Paul M. Sykes; Bradley Arant Boult Cummings LLP

(57) ABSTRACT

An apparatus for testing an implement having an elongate shaft with a head end and a grip end, with a head attached to the head end. The apparatus may include a wind tunnel with a test cell adapted to receive the head of the implement and permit a range of unrestricted movement of the head within the test cell. The test cell includes an inlet and outlet for air flow and a portal or opening in a wall of the cell to which an elongate conduit is attached. The conduit extends in a direction substantially normal, or radial, to the direction of airflow. The conduit is adapted to receive the shaft of the implement, with the grip end of the implement extending beyond the far end of the conduit and into a clamp. The clamp is adapted to hold the grip end of the shaft in a fixed position.

1 Claim, 2 Drawing Sheets

WIND TUNNEL TEST APPARATUS

CROSS-REFERENCE TO RELATED APPLICATIONS

This application is a continuation of patent application Ser. No. 12/561,865, filed on Sep. 17, 2009, which has been allowed as of Jan. 23, 2012; which cites the priority of provisional U.S. patent application No. 61/097,809, filed Sep. 17, 2008. The contents of U.S. Ser. Nos. 12/561,865 and 61/097,809 are incorporated by reference herein in their entireties.

BACKGROUND

The present invention relates generally to an apparatus for testing in a wind tunnel an elongate object, which, in its normal use, has a fixed end and a free end, and in particular such an object with a head unit coupled to a shaft. The exemplary object used throughout this description is a golf club, but it should be understood the present invention, and embodiments thereof, may be utilized with other objects.

Wind tunnels are highly useful for testing the aerodynamics of the shape of an object and for testing the object's dynamic response to aerodynamic forces. Sporting implements, and in particular golf clubs, are subjected to aerodynamic forces as they are swung or otherwise propelled through the air. Thus, at the most basic level, one would expect a more streamlined or aerodynamic head shape should pass through the air with less turbulence and at a higher speed. With respect to golf clubs, a streamlined or aerodynamic shape of the golf club head could be achieved by mounting the head within a wind tunnel, measuring the aerodymanic efficiency of the head, and reshaping the head to attempt to improve its aerodynamics.

Such an approach, however, fails to test the effect of head aerodynamics on the head and shaft coupled together. In order for a wind tunnel to accommodate a full swing golf club, such as a driver, the wind tunnel would need to be at least five feet wide and provide means for fixing the grip end of the shaft in place. Wind tunnels of this size are not readily available and are quite expensive to build or use. Further, if the entire club (head and shaft) is placed in the air stream, the aerodynamic response of the shaft to the wind stream couples with the response of the head. This complicates the task of determining the effect of aerodynamics of the head on club performance. What is needed is an apparatus to allow testing of the dynamic response of an elongate object, with a head attached to a shaft fixed in position, to aerodynamic forces substantially isolated on the head of the object.

SUMMARY

One embodiment of the present invention comprises an apparatus for testing an implement having an elongate shaft with a head end and a grip end, with a head attached to the head end. The apparatus may include a wind tunnel with a test cell adapted to receive the head of the implement and permit a range of unrestricted movement of the head within the test cell. The test cell includes an inlet and outlet for air flow and a portal or opening in a wall of the cell to which an elongate conduit is attached. The conduit extends in a direction substantially normal, or radial, to the direction of airflow. The conduit is adapted to receive the shaft of the implement, with the grip end of the implement extending beyond the far end of the conduit and into a clamp. The clamp is adapted to hold the grip end of the shaft in a fixed position. The clamp may also comprise a rotary element allowing for rotation or radial movement of the shaft to simulate changes in face angle of the head relative to the air flow. In a preferred embodiment, the end of the conduit proximate the grip end of the implement has a closable membrane that allows the grip end to extend through it with minimal loss of airflow. In use, aerodynamic forces applied primarily on the club head by the air flow through the test cell induce regular or irregular vibrations, oscillations, or other movements in the implement. Each of the cross-sectional dimensions of the conduit and of the test cell is sufficient to permit a desired range of unrestricted movement of the shaft and head as the implement undergoes such movements. In a preferred embodiment, at least a portion of both the elongate conduit and of the walls of the test cell are transparent for viewing or measuring the movement of the shaft and head.

Another embodiment of the invention comprises a wind tunnel comprising a test cell, having a width longer than the length of the elongate implement with an head attached to a shaft, such as a golf club. The apparatus comprises an elongate conduit mounted within the test cell, with the longitudinal axis of the conduit being substantially normal to the direction of the air flow. The conduit is adapted to receive the shaft of the implement, with the grip end of the implement extending beyond the far end of the conduit and into a clamp. The clamp is adapted to hold the grip end of the shaft in a fixed position. The clamp may also comprise a rotary element allowing for rotation or radial movement of the shaft to simulate changes in face angle of the head relative to the air flow. Each of the cross-sectional dimensions of the conduit and of the test cell is sufficient to permit a desired range of unrestricted movement of the shaft and head as the implement undergoes such movements. In a preferred embodiment, at least a portion of both the elongate conduit and of the walls of the test cell are transparent for viewing or measuring the movement of the shaft and head.

DESCRIPTION OF DRAWINGS

These and other features, aspects, structures, advantages, and functions are shown or inherent in, and will become better understood with regard to, the following description and accompanied drawings where.

DETAILED DESCRIPTION

Figure 1A:
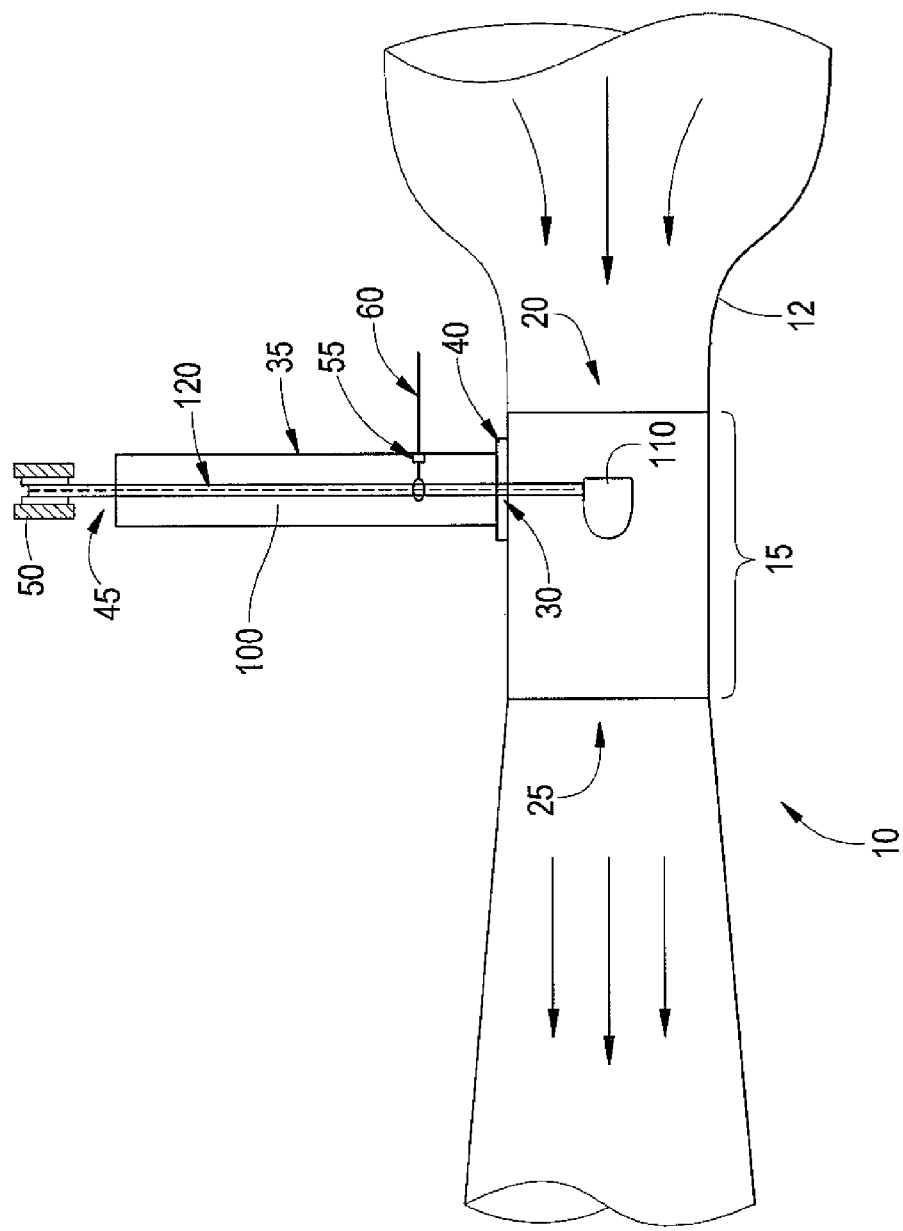
FIG. 1A is a plan view of one embodiment of the present invention.

Referring to FIG. 1A, one embodiment of the present invention comprises an apparatus 10 for testing the dynamic response an elongate object, such as a sporting implement with a head and shaft, and more particularly as shown, a golf club 100 with a head 110 and shaft 120, to aerodynamic forces. As used herein, the term golf club shall be exemplary of any elongate object with a head and shaft capable of being used with the present invention. As shown in FIG. 1A, apparatus 10 comprises a wind tunnel 12 with an area designated as a test cell 15 through which air passes when the wind tunnel is in operation. The test cell 15 comprises an inlet 20 and outlet 25 for air flow and, in a wall of the test cell 15, a portal 30. Attached to the portal 30 is an elongate conduit 35 adapted to receive the shaft of the club and allow a portion of the grip of the shaft to extend past the far terminus of the conduit 35 and be held in place by a clamp 50.

The wind tunnel may be any conventional wind tunnel, but it is contemplated that in a preferred embodiment the wind tunnel will be significantly smaller in its cross-sectional dimension than the length of the golf club. The inlet and outlet allow unrestricted air flow over the head 110 of club 100 and through the test cell 15. In a preferred embodiment, at least a portion of a wall of the test cell 15 is transparent for viewing the response of the club to the aerodynamic forces exerted on it by the air flow.

The elongate conduit 35 is preferably made of a transparent material, or includes a transparent section, again for observing the response of the club to aerodynamic forces. The conduit is sized to be somewhat shorter in length than the shaft of the golf club to permit the grip end of the shaft to extend into the clamp 50. The clamp 50 holds the grip end of the shaft firmly in place and may be any traditional type of mechanical clamping device. In preferred embodiment, the clamp 50 may include elastomeric or cushioning members to hold the shaft tightly while also protecting from damage, as well as to simulate the dampening effect of a golfer's grip on the shaft during swing. The clamp may also include a rotary element to allow for rotation of the shaft in order to change the face angle of the head relative to the air stream. Any suitable mechanical or electromechanical rotary element may be used for this purpose, and preferably the rotary element allows for rotation of the shaft while the system is under test conditions with full air flow. The distal end of the conduit 35 (closest to the grip end of the shaft) preferably terminates in a closable membrane or cover 45 containing a slit or aperture through which the shaft 120 may extend. The membrane or cover 45 serves to minimize air loss from the wind tunnel. In a still further preferred embodiment, the conduit 35 may be fitted with a small aperture 55 through which a thin line or string 60 passes. The line 60 may be tied or attached to the shaft 120 and used to brake or arrest movement of the shaft caused by the aerodynamic forces of the air flow through the wind tunnel. A padded collar 40 may be used to facilitate fitting or sealing the conduit 35 to the wall of the test cell 15 at portal 30. In a still further preferred embodiment, the end of the conduit 35 and portal 30 may be threaded for ease of installing and removal of the conduit 35 when the wind tunnel 12 is being used for other purposes. In addition, the test cell may be provided with a cap or other closure device to seal the portal 30 when the conduit 35 is not installed.

No particular size or shape is required for the test cell, but it should be of sufficient size to allow substantially unimpeded air flow above, below, and on either side of the club 110 during testing. In addition, it is possible or even likely that regular or irregular vibrations, oscillations, or other movements may develop in the shaft 120 of certain elongate objects under test as a result of aerodynamic forces applied primarily to the head 110. Because the grip end of the shaft 120 is fixed by the clamp 50, the amplitude of the movements typically increases in magnitude along the shaft from the grip end (a zero amplitude) to the head 110. In order to observe these movements, the test cell should be of sufficient size to allow a desired range of movement of the head 110 in three dimensional space, without collision with the walls of the test cell 15. Likewise, the conduit 35 must have a cross sectional dimension sufficient to allow a desired range of movement of the shaft 120 within the conduit 35, without collision with its walls.

The wind tunnel 12 includes a motor and fan, or other traditional means, to generate air flow to simulate the desired aerodynamic conditions for the object under test. For golf clubs, the desired velocity of air flow generated by the wind tunnel ranges from approximately 60 mph (88 feet per second) to 130 mph (191 feet per second), which is the range within which most golfers swing clubs such as drivers and other woods.

In use, air flows over the club head, which is suspended in the test cell at the end of the shaft. Therefore, aerodynamic forces experienced by the head are transferred to the shaft, and the response of the head and shaft in combination, as a system, to these forces can be observed and measured. The club head and shaft may vibrate, oscillate, and move in response to the aerodynamic forces in regular or irregular patterns. It is possible that resonant or unstable forces may be generated within the club during test, at which times it may be desirable to arrest the movement of the shaft using the line 60.

Figure 1B:
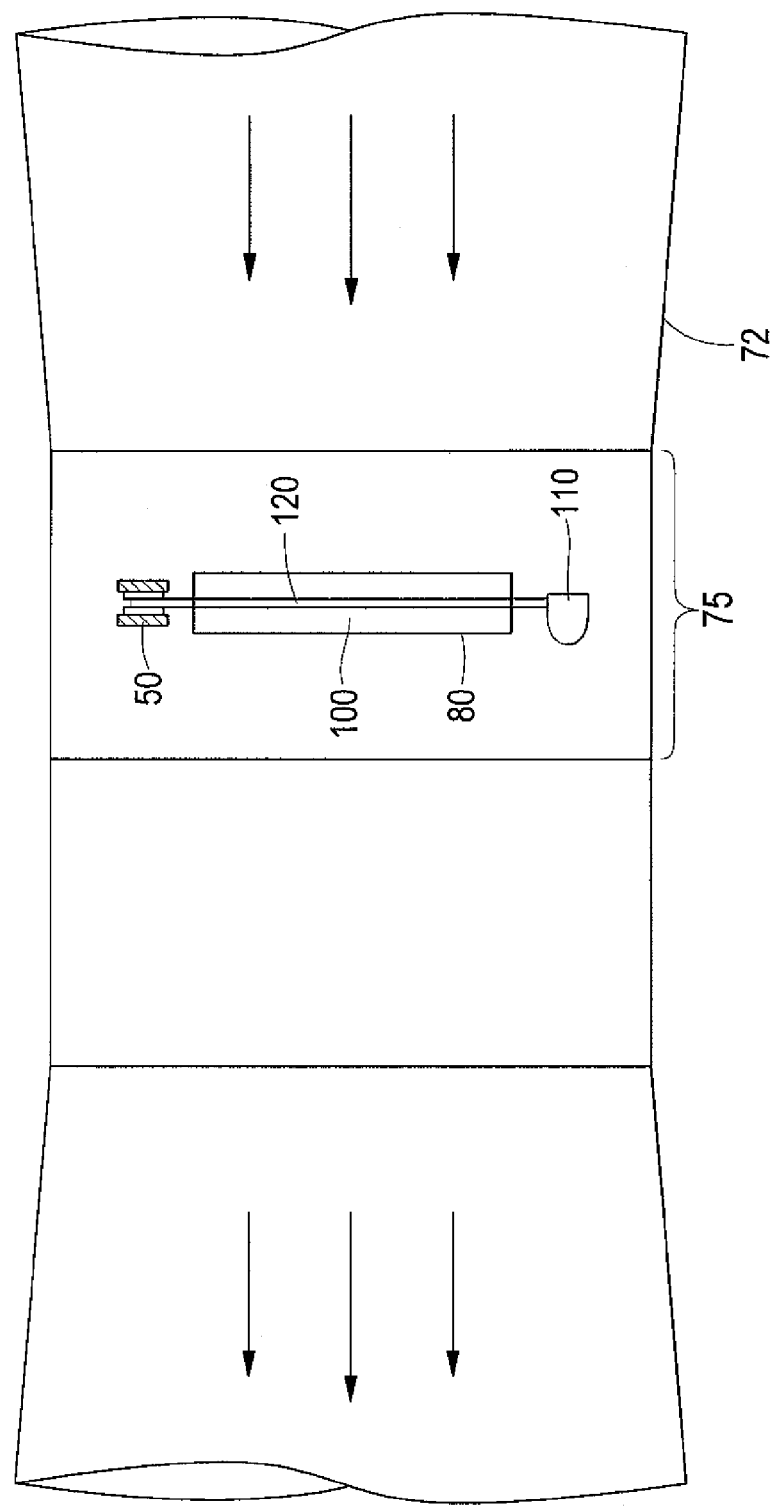
FIG. 1B is a plan view of another embodiment of the present invention.

A second embodiment of the present invention is shown in FIG. 1B. Test apparatus 70 comprises a wind tunnel 72 with an area designated as a test cell 75. The width of the test cell is sufficient to accommodate the length of a golf club 100. An elongate conduit 80 is mounted in the test cell 75 by any traditional means, with its longitudinal axis substantially normal to the direction of air flow. The shaft 120 of the club 100 extends through the conduit 80 with the grip end of the shaft conduit extending from the terminus of the conduit and being fixed in place by a clamp 50. The conduit should be mounted far enough away from the inner surfaces of the wind tunnel to allow a desired range of movement of the club head without collision with of the club head with these walls. As with the first embodiment, the conduit is sized to allow a desired range of movement of the shaft as the club responds to aerodynamic forces exerted on the head. The distal end of the conduit 70 (closest to the grip end of the shaft) preferably terminates in a closable membrane or cover 45 containing a slit or aperture through which the shaft 120 may extend. The membrane or cover 45 serves to minimize effects from air flow through the conduit. Similarly, at least a portion of a wall of the test cell 75 and of the conduit 80 are transparent to allow viewing of the golf club, and more specifically, of movements of the golf club, as it is subjected to aerodynamic forces.

By substantially shielding the shaft from the air flow in the test cell, the forces acting on the head-shaft system are those resulting from the aerodynamics of the head. Thus, either embodiment of the apparatus of the present invention allows isolation of the effect of head aerodynamics on the head-shaft system dynamic response.

The invention claimed is:

1. An apparatus for testing a sports implement having an elongate shaft with a head end and a grip end, with a head attached to the head end, said apparatus comprising:
   a wind tunnel comprising a test cell adapted to receive the head of said implement and permit a range of unrestricted movement of said head therein, said test cell comprising an inlet and outlet for air flow and a portal;
   an elongate conduit adapted to receive the shaft of said sports implement, said conduit having a first end and a second end, the first end attached to said portal and extending therefrom in a direction substantially normal to the direction of airflow through said test cell, said second end comprising a closable membrane adapted to permit the grip end to extend therethrough with minimal airflow; and
   a fixed mount proximate the second end of said conduit, said mount adapted to clamp the grip end of said shaft in a fixed position.

* * * * *